US006792048B1

(12) United States Patent
Lee et al.

(10) Patent No.: US 6,792,048 B1
(45) Date of Patent: Sep. 14, 2004

(54) TERMINAL SUPPORTING SIGNALING USED IN TRANSMISSION AND RECEPTION OF MPEG-4 DATA

(75) Inventors: Yung Lyul Lee, Seoul (KR); In-hwan Kim, Suwon (KR); Yoon-soo Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 743 days.

(21) Appl. No.: 09/698,204

(22) Filed: Oct. 30, 2000

(30) Foreign Application Priority Data

Oct. 29, 1999 (KR) ........................................ 1999-47515

(51) Int. Cl.[7] .......................... H04B 1/66; G06T 15/70; H04N 7/24
(52) U.S. Cl. ................................................ 375/240.26
(58) Field of Search ...................... 375/240.01, 240.12, 375/240.22, 240.26, 240.13, 240.25, 240.16; 348/14.08, 384.1; 345/302, 474, 414; 455/414, 412; H04B 1/66; G06T 15/70; H04N 7/24

(56) References Cited

U.S. PATENT DOCUMENTS

| 6,317,131 B2 * | 11/2001 | Basso et al. ................. 345/474 |
| 6,515,695 B1 * | 2/2003 | Sato et al. ............... 348/14.08 |
| 6,614,845 B1 * | 9/2003 | Azadegan .............. 375/240.13 |
| 2001/0000962 A1 * | 5/2001 | Rajan ........................ 345/302 |
| 2002/0055352 A1 * | 5/2002 | Samata ....................... 455/414 |

FOREIGN PATENT DOCUMENTS

| EP | 1100270 A2 * | 5/2001 | .......... H04N/07/24 |
| JP | 6-125539 A | 5/1994 | |
| JP | 8-84331 A | 3/1996 | |
| JP | 9-93133 A | 4/1997 | |
| JP | 9-107544 A | 4/1997 | |
| JP | 9-182087 | 7/1997 | |
| JP | 9-326873 | 12/1997 | |
| JP | 11-74798 | 3/1999 | |

OTHER PUBLICATIONS

Imaging Electronics Association Journal, vol. 28, No. 3 (1999).
Toshihiko Wakahara et al.; "A Study on the InterOperability of Multimedia Communication Service"; Global Information Telecommunication Institute, Waseda University; pp. 17–22.
MPEG–4; and its Application to Mobile Videophone by Toshio Miki and Toshiro Kawahara (Multimedia Labs and NTT Mobile Communications Network Inc.

* cited by examiner

Primary Examiner—Tung T. Vo
(74) Attorney, Agent, or Firm—Sughrue Mion, PLLC

(57) ABSTRACT

A terminal that supports signaling used in the transmission and reception of the Moving Picture Experts Group (MPEG)-4 data. The terminal includes a video codec for performing video coding/decoding, an audio codec for performing audio coding/decoding, a multiplexer for performing multiplexing on encoded data, and a system controller for performing signaling for negotiating the terminal capability. The system controller includes a video capability registration unit for registering a plurality of parameters for determining video capability, at least one of which is a parameter for determining video capability that conforms to the Moving Picture Experts Group (MPEG)-4 standard, an audio capability registration unit for registering a plurality of parameters for determining audio capability, at least one of which is a parameter for determining audio capability that conforms to the MPEG-4 standard, and a system capability registration unit for registering a plurality of parameters, at least one of which is a parameter for determining system capability that conforms to the MPEG-4 standard. The terminal can perform signaling used in supporting of the MPEG-4 standard, on which MPEG-4 visual, audio, and system applications in a video teleconferencing system are based.

16 Claims, 2 Drawing Sheets

TERMINAL SUPPORTING SIGNALING USED IN TRANSMISSION AND RECEPTION OF MPEG-4 DATA

BACKGROUND OF THE INVENTION

1. Field of the Invention

The present invention relates to a terminal that supports video conferencing, and more particularly to, a terminal in which communication parameters of the Moving Picture Experts Group (MPEG)-4 scheme is registered in a control protocol for supporting video teleconferencing. The present application is based on Korean Application Number 1999-47515, which is incorporated herein by reference.

2. Description of the Related Art

In order to realize a video teleconferencing system, the International Telecommunications Union (ITU) developed the Recommendations H.323 and H.324M. The Internet Engineer Task Force (IETF) recommends the media gateway control protocol (MGCP) for supporting packet-based video data communications over the Internet. Development of MPEG-4 related standards such as the International Organization for Standardization (ISO)/International Electrotechnical Commission (IEC) 14496 allows for enhanced video data processing. However, a conventional terminal has not yet supported the MPEG-4 standard. Thus, a terminal that supports video conferencing is required to support the MPEG-4 standard.

SUMMARY OF THE INVENTION

To solve the above problems, it is an object of the present invention to provide a terminal that supports signaling used in transmission and reception of the Moving Pictures Experts Group (MPEG)-4 data in order to apply the signaling to MPEG-4 video data, audio data and system data.

Accordingly, to achieve the above object, a terminal according to the present invention includes a video codec for performing video coding/decoding, an audio codec for performing audio coding/decoding, a multiplexer for performing multiplexing on encoded data, and a system controller for performing signaling for negotiating the terminal capability. The system controller includes: a video capability registration unit for registering a plurality of parameters for determining video capability, at least one of which is a parameter for determining video capability that conforms to the Moving Picture Experts Group (MPEG)-4 standard; an audio capability registration unit for registering a plurality of parameters for determining audio capability, at least one of which is a parameter for determining audio capability that conforms to the MPEG-4 standard; and a system capability registration unit for registering a plurality of parameters, at least one of which is a parameter for determining system capability that conforms to the MPEG-4 standard.

The parameters for determining the video capability, audio capability, and system capability that conform to the MPEG-4 standard are each defined in the standards International Organization for Standardization (ISO)/International Electrotechnical Commission (IEC) 14496-2, ISO/IEC 14496-3, and ISO/IEC 14496-1. Furthermore, assuming that the terminal complies with the H.323 standard, which is a video teleconferencing system related standard defined by the International Telecommunication Union-Terminal Sector (ITU-T), the system controller is based on the H.245 standard which specifies a control protocol in the system related standard. Alternatively, the system controller may be based on the session description protocol (SDP) in the media gateway control protocol (MGCP) for supporting packet-based video data communications over the Internet, which is defined by the Internet Engineer Task Force (IETF).

In order to determine a visual profile that conforms to the MPEG-4 standard and the level of the visual profile, the video capability registration unit defines a protocol element comprising at least one among the parameters profileAndLevel-NBitL2, profileAndLevel-MainL4, profileAndLevel-MainL2, profileAndLevel-CoreL2, profileandLevel-CoreL1, profileAndLevel-SimpleScalable, profileAndLevel-SimpleL3, profileandLevel-SimpleL2, and profileAndLevel-SimpleL1 corresponding to NBitL2, MainL4, MainL2, CoreL2, CoreL1, SimpleScalable, SimpleL3, SimpleL2, and SimpleL1 which are visual profiles defined by the ISO/IEC 14496-2 standard which conforms to MPEG-4 Version 1. In this case, the parameters are defined as "BOOLEAN", and one of the parameters is selectively registered.

Furthermore, the video capability registration unit defines a protocol element further comprising at least one of a parameter typicalVisualSessionSize for determining a session size, a parameter maximumTotalNumberOfObjects for determining a maximum number per type, a parameter maximumNumberDifferentQuantization-Table for determining the maximum number of different quantization tables, a parameter maxTotalReferenceMemory for determining the maximum capacity of a reference memory, a parameter maximumNumberOfMBsec for determining the maximum number of macroblocks transmitted per second, a parameter costFunctionEquivalent for determining the number of macroblocks transmitted per second, a parameter maximumVBVBuffer-Size for determining the maximum buffer size of a video buffer verifier (VBV), a parameter maxVideoPacketLength for determining the length of a video packet, a parameter for determining the size of background image, a parameter wavelet-Restrictions for determining the characteristic of a wavelet filter, a parameter maxBitrate for determining a maximum bit rate, and a parameter maxEnhancement-LayersPerObject for determining the maximum number of enhancement layers per object, which is defined by the ISO/IEC 14496-2 which conforms to MPEG-4 Version 1.

In order to determine an audio profile and the level of the audio profile which conform to the MPEG-4 standard, the audio capability registration unit defines a protocol element comprising at least one of the parameters profileAndLevel-MainL4, profileAndLevel-MainL3, profileAndLevel-MainL2, profileAndLevel-MainL1, profileAndLevel-ScalableL4, profileAndLevel-ScalableL3, profileAndLevel-ScalableL2, profileAndLevel-ScalableL1, profileAndLevel-SpeechL2, profileAndLevel-SpeechL1, profileAndLevel-SynthesisL3, profileAndLevel-SynthesisL2, and profileAndLevel-SynthesisL1 corresponding to MainL4, MainL3, MainL2, MainL1, ScalableL4, ScalableL3, ScalableL2, ScalableL1, SpeechL2, SpeechL1, SynthesisL3, SynthesisL2, and SynthesisL1 which are audio profiles defined in the ISO/IEC 14496-1 which conforms to MPEG-4 Version 1. In this case, the parameters are defined as "BOOLEAN", and one of the parameters is selectively registered.

Furthermore, preferably, the audio capability registration unit defines a protocol element further comprising at least one of a parameter pcu for denoting a processor complexity unit in mega operations per second (MOPS) times 1, and a parameter rcu for denoting a RAM complexity unit, which are defined in the ISO/IEC 14496-1 which conforms to MPEG-4 Version 1.

Preferably, the audio capability registration unit defines a protocol element further comprising at least one of the parameters audioSampling16 k, audioSampling22.05 k, and audio Sampling48 k for determining audio sampling frequency, the parameters being defined in the ISO/IEC 14496-1 which conforms to MPEG-4 Version 1.

Preferably, the audio capability registration unit defines a protocol element further comprising at least one of a parameter numberOfMonoObjects for determining the number of mono objects, a parameter numberOfStereoObjects for determining the number of stereo objects, and a parameter numberOfSpeech-Objects for determining the number of speech objects which are defined in the ISO/IEC 14496-1 which conforms to MPEG-4 Version 1.

Preferably, the audio capability registration unit defines a protocol element further comprising at least one of a parameter memoryForData for determining the size of data memory, parameters lowProcessing and highProcessing, which are reserved in association with complexity, and a parameter numberOfTTSIObjects for determining the number of text-to-speech information (TTSI) objects which are defined in the ISO/IEC 14496-1 which conforms to MPEG-4 Version 1.

In order to determine an MPEG compliant system profile and the level of the system profile, a plurality of parameters defined in the ISO/IEC 14496-1, which conforms to MPEG-4 Version 1, are defined as "BOOLEAN", thereby registering one selected from the plurality of parameters. The video codec and the audio codec comprise an MPEG-4 video codec means for performing video coding/decoding, and an MPEG-4 audio codec means for performing audio coding/decoding. The MPEG-4 video codec means and MPEG-4 audio codec means perform the video and audio coding/decoding defined in the ISO/IEC 14496 standard.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Figure 1:
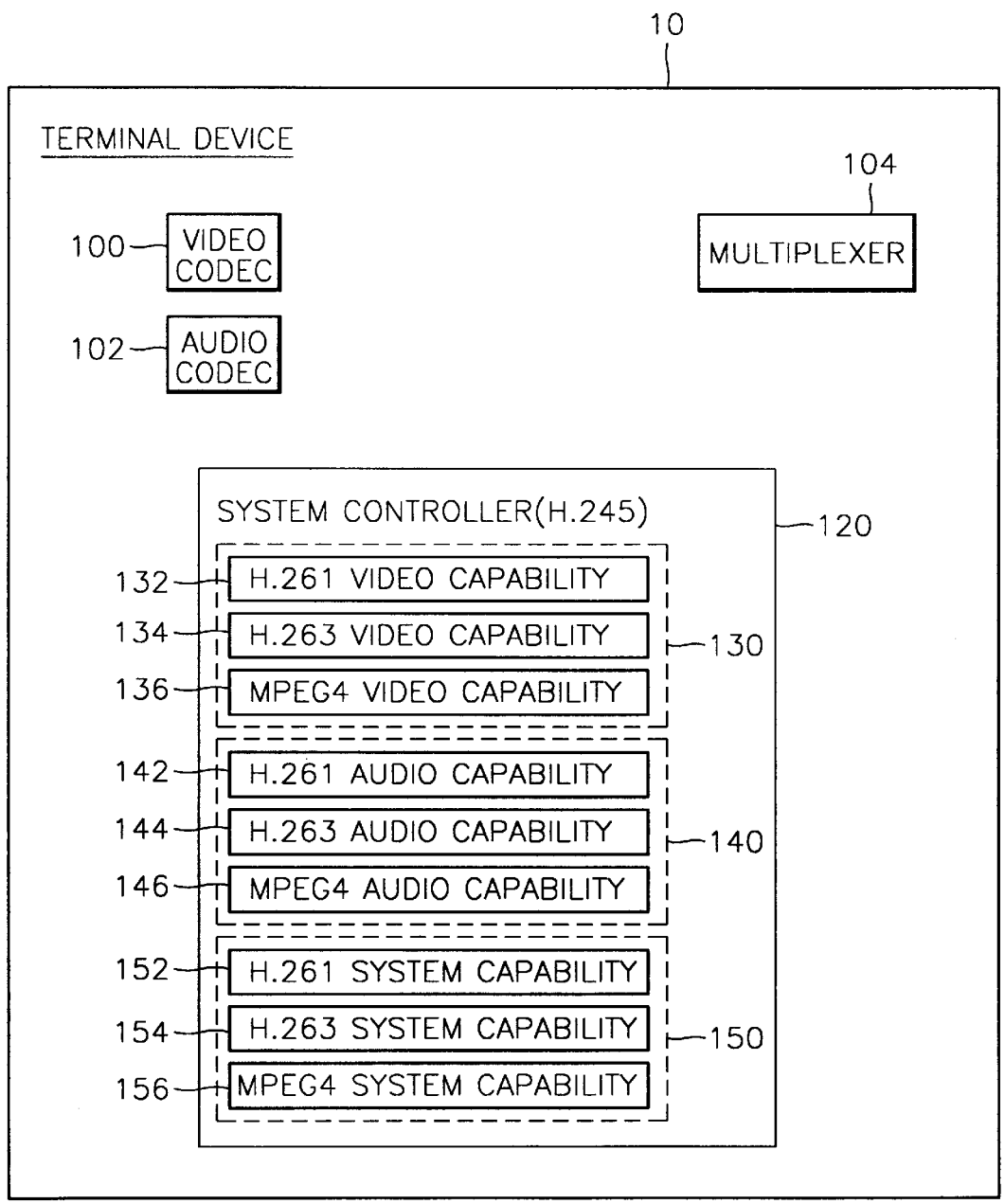
FIG. 1 is a block diagram showing the configuration of a terminal according to the present invention.

Referring to FIG. 1, a terminal device according to an embodiment of the present invention includes a video codec 100, an audio codec 102, a multiplexer 104, and a system controller 120. The video codec 100 performs video coding and decoding. The audio codec 102 performs audio coding and decoding. The multiplexer 104 performs multiplexing of encoded data. The system controller 120 performs signaling for negotiating the capability of a terminal. Furthermore, assuming that the terminal device 10 conforms to the H.323 standard, which is a video teleconferencing system related standard defined by the International Telecommunication Union-Terminal Sector (ITU-T), the system controller 120 complies with the H.245 standard, which provides the control protocol in the system related standard. The system controller 120 also includes a video capability registration unit 130, an audio capability registration unit 140, and a system capability registration unit 150.

The video capability registration unit includes an H.261 video capability registration unit 132, an H.263 video capability registration unit 134, and a Moving Picture Experts Group (MPEG)-4 video capability registration unit 136, and registers parameters to be used in a video communications protocol. Each parameter is registered as follows:

```
VideoCapability                          ::=choice
{
nonStandard                              NonStandard Parameters,
h.261VideoCapability                     h.261 Video Capability,
h.263VideoCapability                     h.263 Video Capability,
    .                                        .
    .                                        .
MPEG4VideoCapability                     MPEG-4 Video Capability
}
MPEG4VideoCapability                     ::=SEQUENCE
{
profileAndLevel-NBitL2                   BOOLEAN,
profileAndLevel-MainL4                   BOOLEAN,
profileAndLevel-MainL2                   BOOLEAN,
profileAndLevel-CoreL2                   BOOLEAN,
profileAndLevel-CoreL1                   BOOLEAN,
profileAndLevel-SimpleScalable           BOOLEAN,
profileAndLevel-SimpleL3                 BOOLEAN,
profileAndLevel-SimpleL2                 BOOLEAN,
profileAndLevel-SimpleL1                              BOOLEAN,
    .                                        .
    .                                        .
typicalVisualSessionSize                 INTEGER,
maximumTotalNumberOfObjects              INTEGER,
maximumNumberPerType                     INTEGER,
maximumNumberDifferentQuantizationTable  INTEGER,
maxTotalReferenceMemory                  INTEGER,
maximumNumberOfMBsec                     INTEGER,
costFunctionEquivalent                   INTEGER,
maximumVBVBufferSize                     INTEGER,
maxVideoPacketLength                     INTEGER,
maxSpriteSize                            INTEGER,
waveleteRestriction                      INTEGER,
maxBitrate                               INTEGER,
maxEnhancementLayersPerObject            INTEGER,
    .
    .
}
```

More specifically, initially, in order to determine video capability to be used in communication between two terminals, a plurality of parameters are registered. Here, one among the plurality of parameters registered by "::=choice" is selectively used. In the embodiment, the parameter non-Standard for determining video capability that does not conform to a standard, the parameter h.261VideoCapability for determining video capability that conforms to the H.261 standard, the parameter h.263VideoCapability for determining video capability that conforms to the H.263 standard, and the parameter MPEG4VideoCapability for determining video capability that conforms to the MPEG-4 standard, are registered.

Only the parameter MPEG4VideoCapability, which is a distinctive feature of the present invention, will now be described. Thus, the parameter MPEG4VideoCapability is defined as "::=SEQUENCE", thereby requiring registrations of all of its particular parameters. The particular parameters are as follows.

A plurality of parameters for determining a visual profile and the level of the visual profile are defined as "BOOLEAN", and one of the parameters is selectively registered. For example, one among the parameters profileAndLevel-NBitL2, profileAndLevel-MainL4, profileAndLevel-MainL2, profileAndLevel-CoreL2, profileAndLevel-CoreL1, profileAndLevel-SimpleScalable, profileAndLevel-SimpleL3, profileandLevel-SimpleL2, and profileAndLevel-SimpleL1 is set to "1", and the remaining parameters are all set to "0". Therefore, one is selected from visual profiles conforming to MPEG-4 Version 1, i.e., NBitL2, MainL4, MainL2, CoreL2, CoreL1, SimpleScalable, SimpleL3, SimpleL2, and SimpleL1.

Furthermore, the particular parameters for the selected visual profile are each registered. Those particular parameters include the parameter typicalVisualSessionSize for determining a session size, the parameter maximumTotalNumberOfObjects for determining a maximum number per type, the parameter maximumNumberDifferentQuantizationTable for determining the maximum number of different quantization tables, the parameter maxTotalReferenceMemory for determining the maximum capacity of a reference memory, the parameter maximumNumberOfMBsec for determining the maximum number of macroblocks transmitted per second, the parameter costFunctionEquivalent for determining the number of macroblocks transmitted per second, the parameter maximumVBVBufferSize for determining the maximum buffer size of a video buffer verifier (VBV), the parameter maxVideoPacketLength for determining the length of a video packet, the parameter maxSpriteSize for determining the size of background image, the parameter waveletRestrictions for determining the characteristic of a wavelet filter, the parameter maxBitrate for determining a maximum bit rate, and the parameter maxEnhancementLayersPerObject for determining the maximum number of enhancement layers per object. These parameters are set to integer values, thereby determining a transmission characteristic of each parameter.

The audio capability registration unit 140 includes an H.261 audio capability registration unit 142, an H.263 audio capability registration unit 144, and an MPEG-4 audio capability unit 146, and registers parameters to be used for an audio communication protocol as follows:

```
Audio Capability                ::=choice
{
nonStandard                     NonStandard Parameters,
g711Alaw64K                     INTEGER (1-256),
is138118AudioCapability         IS13838 Audio Capability,
    .
    .
    .
MPEG4AudioCapability            MPEG-4 Audio Capability
    .
    .
    .
gsmEnhancerFullRate             GSM Audio Capability
}
MPEG4AudioCapability            ::=SEQUENCE
{
profileAndLevel-MainL4          BOOLEAN,
profileAndLevel-MainL3          BOOLEAN,
profileAndLevel-MainL2          BOOLEAN,
profileAndLevel-MainL1          BOOLEAN,
profileAndLevel-Scalable4       BOOLEAN,
profileAndLevel-Scalable3       BOOLEAN,
profileAndLevel-Scalable2       BOOLEAN,
profileAndLevel-Scalable1       BOOLEAN,
```

-continued

```
profileAndLevel-SpeechL2        BOOLEAN,
profileAndLevel-SpeechL1        BOOLEAN,
profileAndLevel-SynthesisL3     BOOLEAN,
profileAndLevel-SynthesisL2     BOOLEAN,
profileAndLevel-SynthesisL1     BOOLEAN,
    .
    .
    .
pcu                             INTEGER,
rcu                             INTEGER,
    .
    .
audioSampling16K                BOOLEAN,
audioSampling22.05K             BOOLEAN,
audioSampling48K                BOOLEAN,
    .
    .
    .
numberOfMonoObject              INTEGER,
numberOfStereoObjects           INTEGER,
numberOfSpeechObjects           INTEGER,
memoryForData                   INTEGER,
lowProcessing                   BOOLEAN,
highProcessing                  BOOLEAN,
numberOfTTSIObjects             INTEGER,
maxEnhancementLayersPerObject   INTEGER,
    .
    .
    .
}
```

More specifically, initially, in order to determine audio capability to be used in communication between two terminals, a plurality of parameters are registered. Here, one among the plurality of parameters defined as "::=choice" is selectively used. In the embodiment, the parameter nonstandard for determining audio capability that does not conform to a standard, the parameter g711Alaw64 k for determining audio capability conforming to the Alaw option of g711, which is the audio codec related format, and corresponding to a transmission speed of 64 Kbps, the parameter 1S13818AudioCapability for determining audio capability that conforms to the 1S13818 standard, the parameter MPEG4AudioCapability for determining audio capability that conforms to the MPEG-4 standard, and the parameter gsmEnhanceFullRate for determining audio capability that conforms to the GSM (Global System for Mobile Communications) standard, are each registered.

Only the parameter MPEG4AudioCapability, which is a distinctive feature of the present invention, will now be described. The parameter MPEG4AudioCapability is defined as "::=SEQUENCE", requiring registrations of all of its particular parameters. The particular parameters are as follows.

A plurality of parameters for determining an audio profile and the level of the audio profile are defined as "BOOLEAN", and one of the parameters is selectively registered. For example, one among the parameters profileAndLevel-MainL4, profileAndLevel-MainL3, profileAndLevel-MainL2, profileAndLevel-MainL1, profileAndLevel-ScalableL4, profileAndLevel-ScalableL3, profileAndLevel-ScalableL2, profileAndLevel-ScalableL1, profileAndLevel-SpeechL2, profileAndLevel-SpeechL1, profileAndLevel-SynthesisL3, profileAndLevel-SynthesisL2, and profileAndLevel-SynthesisL1 is set to "1", and the remaining parameters are all set to "0". Therefore, one is selected from audio profiles conforming to the MPEG-4 Version 1, i.e., MainL4, MainL3, MainL2, MainL1, ScalableL4, ScalableL3, ScalableL2, ScalableL1, SpeechL2, SpeechL1, SynthesisL3, SynthesisL2, and SynthesisL1.

Furthermore, the particular parameters for the selected audio profile are each registered. With respect to registration of particular parameters for the audio profile, since it is similar to that of the particular parameters for the visual profile, the description thereof will be omitted.

Meanwhile, the parameter pcu denotes a processor complexity unit in mega operations per second (MOPS) times 1. The parameter rcu denotes a RAM complexity unit. Furthermore, audio sampling frequency is determined by, for example, setting one among the parameters audioSampling16k audioSampling22.05 k, and audioSampling48 k to "1" and the remaining parameters to "0". With respect to a "scalable" audio profile, the following particular parameters are preferably registered: the parameter numberOfMonoObjects for determining the number of mono objects, the parameter numberOfStereoObjects for determining the number of stereo objects, and the parameter numberOfSpeechObjects for determining the number of speech objects. In addition, the parameter memoryForData for determining the size of a data memory, and the parameters lowProcessing and highprocessing, reserved in association with complexity, are preferably registered. Furthermore, the parameter numberOfTTSIObjects for determining the number of text-to-speech information (TTSI) objects is preferably registered.

The system capability registration unit 150 includes H.261 system capability registration unit 152, H.263 system capability registration unit 154, and MPEG-4 system capability registration unit 156, and registers parameters to be used for system control. Each parameter is registered as follows:

```
SystemCapability            ::=choice
{
nonStandard                 NonStandard Parameters,
    .
    .
    .
MPEG4SystemCapability       MPEG-4 System Capability
    .
    .
    .
}
MPEGSystem Capability       ::=SEQUENCE
{
profileAndLevel-OD          BOOLEAN,
profileAndLevel-SD          BOOLEAN,
}
```

More specifically, initially, in order to determine system capability to be used in communication between two terminals, a plurality of parameters are registered. Here, one among the plurality of parameters defined as "::=choice" is selectively used. In the embodiment, the parameter nonstandard for determining system capability that does not conform to a standard, and the parameter MPEG4SystemCapability for determining system capability that conforms to the MPEG-4 standard are registered.

Only the parameter MPEG4SystemCapability, which is a distinctive feature of the present invention, will now be described. The parameter MPEG4SystemCapability is defined as "::=SEQUENCE", requiring registrations of all of its particular parameters. The particular parameters are as follows.

A plurality of parameters for determining a system profile and the level of a system profile are defined as "BOOLEAN", and one of the parameters is selectively registered. The particular parameters are set to integer values or set algebraically, thus determining a system capability characteristic in a signaling process. Since the registration of particular parameters for a system profile is similar to those of the particular parameters for audio and visual profiles, further description will be omitted.

Figure 2:
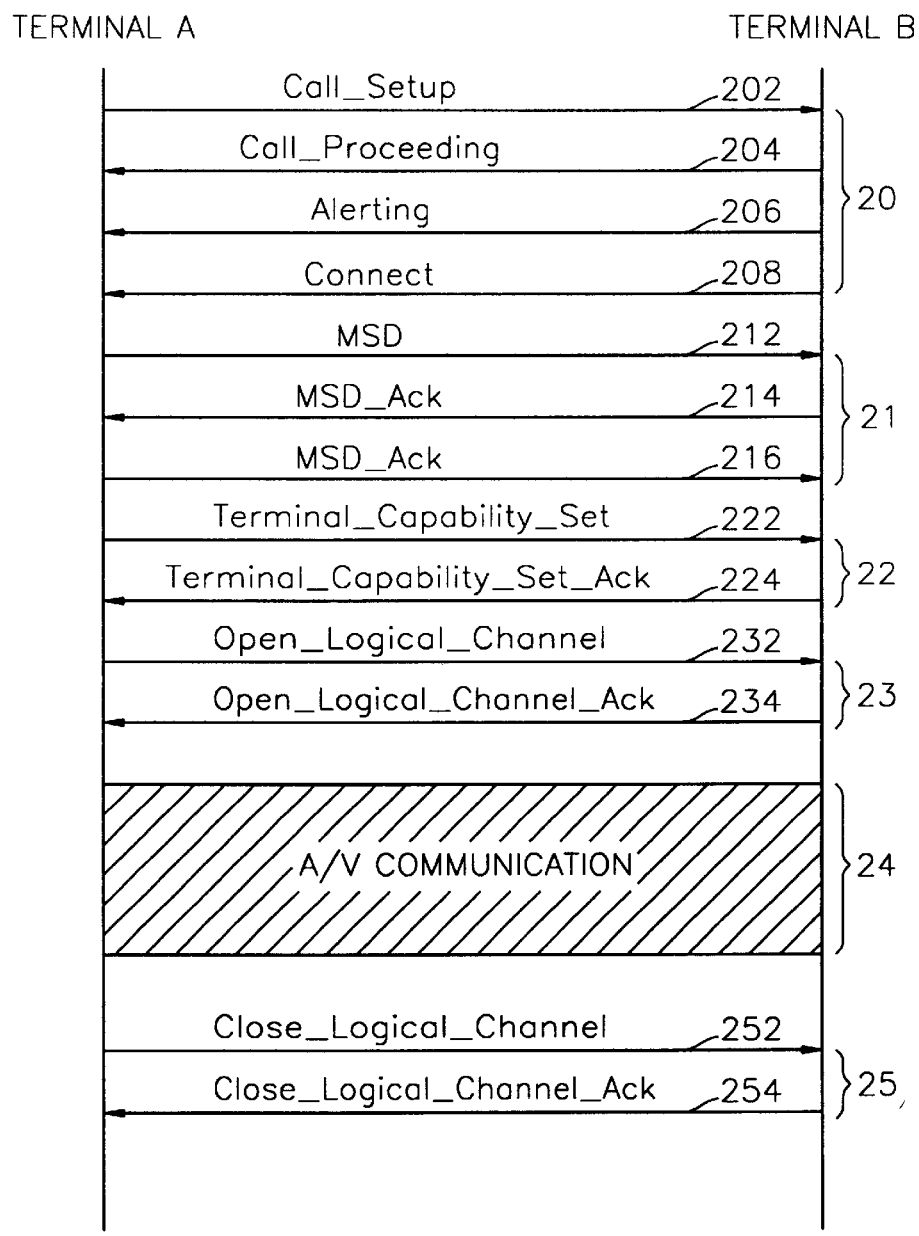
FIG. 2 illustrates the sequence of communications between two terminals for explaining the operation of the terminal of FIG. 1 in which communication parameters of the Moving Picture Experts Group (MPEG)-4 scheme is registered in a control protocol for supporting multimedia data communications.

Preferably, the MPEG-4 video, MPEG-4 audio, and MPEG-4 system in the embodiment conforms to the standards International Organization for Standardization (ISO)/International Electrotechnical Commission (IEC) 14496-2, ISO/IEC 14496-3, and ISO/IEC 14496-1, respectively. FIG. 2 illustrates the communication sequence between two terminals for explaining the operation of the terminal of FIG. 1 in which MPEG-4 communication parameters are registered in a control protocol for supporting multimedia data communications. Referring to FIG. 2, initially, a physical connection is established between two terminals A and B (step 20). More particularly, if the terminal A performs a call setup (step 202), then the terminal B sends a signal $Call_{13}$ Proceeding, indicating that it is turned on and can proceed with a call, to the terminal A (step 204). Furthermore, if the terminal B sends a call alerting signal (step 206) and the terminal A accepts the connection upon receipt of the call alerting signal, the physical connection is established between the two terminals A and B (step 208).

Next, it is determined which terminal of the two terminals A and B will become a master having the final decision right for negotiation and which will become a slave (step 21). For example, the terminal A sends a master slave determination (MSD) signal to the terminal B, thereby requesting the terminal B to determine which terminal is a master and which is a slave (step 212). The terminal B, which receives the MSD signal, sends an acknowledgment signal MSD_Ack to the terminal A (step 214). The terminal A then returns the acknowledgment signal MSD_Ack to the terminal B, thereby completing the determination of master and slave.

For the next step, a process for negotiating the capability of terminals to perform a data transceiving function is performed (step 22). Specifically, when the terminal A is determined to be a master, it sends all its registered terminal capability set data Terminal_Capability Set to the terminal B (step 222). The device according to the present invention sends all parameters and the particular parameters registered by the video capability registration unit 130, the audio capability registration unit 140, and the system capability registration unit 150 as the capability set data Terminal_Capability Set, from the terminal A to the terminal B or vice versa. For example, the terminal B sends an acknowledgment signal Terminal_Capability_Set to the terminal A as an indication of its reception capability for the capability set data Terminal_Capability Set sent from the terminal A.

Next, a logical channel is opened (step 23). More specifically, the terminal A sends a signal Open_Logical_Channel to the terminal B, thereby requesting to open a logical channel according to communication parameters determined during the negotiation process in the step 23 (step 232). In response to the signal Open_Logical_Channel, the terminal B sends an acknowledgment signal Open_Logical_Channel_Ack to the terminal A (step 234), so that a logical channel opens using values corresponding to the negotiated parameters. If the terminals A and B have video capability, audio capability, and system capability that conform to the MPEG-4 scheme such as ISO/IEC 14496-2, ISO/IEC 14496-3, and ISO/IEC 14496-1, the two terminals can perform MPEG-4 compliant audio/visual (A/V) communications.

Here, MPEG-4 compliant A/V data communication is performed through the logical channel (step 24). In this case, as understood by those skilled in the art, the video codec and audio codec provided in the terminals are required to perform video coding/decoding and audio coding/decoding that conform to the MPEG-4 scheme such as ISO/IEC 14996.

Meanwhile, if either terminal desires to end the A/V data communication, the terminal that desires to do so, for example, the terminal A sends a signal Close_Logical_Channel to the terminal B, thereby requesting to close the logical channel (step 252). The terminal B sends an acknowledgment signal Close_Logical_Channel_Ack to the terminal A (step 254), so that the logical channel is closed.

In the terminal according to the present invention, MPEG-4 communication parameters are registered in a control protocol for supporting multimedia data communications in a video teleconferencing system based on protocol standards ITU-T H.323, H.324M, and IETF, also called MGCP, thereby supporting a call setup on which MPEG-4 compliant visual, audio, and system applications are based.

Although the foregoing embodiment has been described with reference to registration of parameters corresponding to characteristics used in MPEG-4 version 1, the present invention will not be restricted thereto, and it is possible to additionally register parameters corresponding to characteristics used in MPEG-4 version 2. Furthermore, although the terminal according to the embodiment has been applied to the Recommendation H.323 which specifies a control protocol in the system related format conforming to Recommendation H.323, the present invention will not be restricted thereto, and it may be adapted to IEFT SDP (Session Description Protocol).

The terminal according to the present invention can perform MPEG-4 signaling on which MPEG-4 visual, audio, system applications are based.

What is claimed is:

1. A terminal including a video codec for performing video coding/decoding, an audio codec for performing audio coding/decoding, a multiplexer for performing multiplexing on encoded data, and a system controller for performing signaling for negotiating the terminal capability, wherein the system controller comprises:
   a video capability registration unit for registering a plurality of parameters for determining video capability, at least one of which is a parameter for determining video capability that conforms to the Moving Picture Experts Group (MPEG)-4 standard;
   an audio capability registration unit for registering a plurality of parameters for determining audio capability, at least one of which is a parameter for determining audio capability that conforms to the MPEG-4 standard; and
   a system capability registration unit for registering a plurality of parameters, at least one of which is a parameter for determining system capability that conforms to the MPEG-4 standard.

2. The terminal of claim 1, wherein parameters for determining the video capability, audio capability, and system capability that conform to the MPEG-4 standard are each defined in the standards International Organization for Standardization (ISO)/International Electrotechnical Commission (IEC) 14496-2, ISO/IEC 14496-3, and ISO/IEC 14496-1.

3. The terminal of claim 1, wherein, assuming that the terminal complies with the H.323 standard, which is a video teleconferencing system related standard defined by the International Telecommunication Union-Terminal Sector (ITU-T), the system controller is based on the H.245 standard which specifies a control protocol in the system related standard.

4. The terminal of claim 1, wherein the system controller is based on the session description protocol (SDP) in the media gateway control protocol (MGCP) for supporting packet-based video data communications over the Internet which is defined by the Internet Engineer Task Force (IETF).

5. The terminal of claim 1, wherein, in order to determine a visual profile and the level of the visual profile that conform to the MPEG-4 standard, the video capability registration unit defines a protocol element comprising at least one among the parameters profileAndLevel-NBitL2, profileAndLevel-MainL4, profileAndLevel-MainL2, profileAndLevel-CoreL2, profileandLevel-CoreL1, profileAndLevel-SimpleScalable, profileAndLevel-SimpleL3, profileandLevel-SimpleL2, and profileAndLevel-SimpleL1 corresponding to NBitL2, MainL4, MainL2, CoreL2, CoreL1, SimpleScalable, SimpleL3, SimpleL2, and SimpleL1 which are visual profiles defined by the ISO/IEC 14496-2 standard which conforms to MPEG-4 Version 1.

6. The terminal of claim 5, wherein the parameters are defined as "BOOLEAN", and one of the parameters is selectively registered.

7. The terminal of claim 5, wherein the video capability registration unit defines a protocol element further comprising at least one of a parameter typicalVisualSessionSize for determining a session size, a parameter maximumTotalNumberOfObjects for determining a maximum number per type, a parameter maximumNumberDifferentQuantizationTable for determining the maximum number of different quantization tables, a parameter maxTotalReferenceMemory for determining the maximum capacity of a reference memory, a parameter maximumNumberOfMBsec for determining the maximum number of macroblocks transmitted per second, a parameter costFunctionEquivalent for determining the number of macroblocks transmitted per second, a parameter maximumVBVBufferSize for determining the maximum buffer size of a video buffer verifier (VBV), a parameter maxVideoPacketLength for determining the length of a video packet, a parameter for determining the size of background image, a parameter waveletRestrictions for determining the characteristic of a wavelet filter, a parameter maxBitrate for determining a maximum bit rate, and a parameter maxEnhancementLayersPerObject for determining the maximum number of enhancement layers per object, which is defined by the ISO/IEC 14496-2 which conforms to MPEG-4 Version 1.

8. The terminal of claim 1, wherein, in order to determine an audio profile and the level of the audio profile which conform to the MPEG-4 standard, the audio capability registration unit defines a protocol element comprising at least one of the parameters profileAndLevel-MainL4, profileAndLevel-MainL3, profileAndLevel-MainL2, profileAndLevel-MainL1, profileAndLevel-ScalableL4, profileAndLevel-ScalableL3, profileAndLevel-ScalableL2, profileAndLevel-ScalableL1, profileAndLevel-SpeechL2, profileAndLevel-SpeechL1, profileAndLevel-SynthesisL3, profileAndLevel-SynthesisL2, and profileAndLevel-SynthesisL1 corresponding to MainL4, MainL3, MainL2, MainL1, ScalableL4, ScalableL3, ScalableL2, ScalableL1, SpeechL2, SpeechL1, SynthesisL3, SynthesisL2, and SynthesisL1 which are audio profiles defined in the ISO/IEC 14496-1 which conforms to MPEG-4 Version 1.

9. The terminal of claim 8, wherein the parameters are defined as "BOOLEAN", and one of the parameters is selectively registered.

10. The terminal of claim 1, wherein the audio capability registration unit defines a protocol element further comprising at least one of a parameter pcu for denoting a processor complexity unit in mega operations per second (MOPS) times 1, and a parameter rcu for denoting a RAM complexity unit, which are defined in the ISO/IEC 14496-1 which conforms to MPEG-4 Version 1.

11. The terminal of claim 10, wherein the audio capability registration unit defines a protocol element further comprising at least one of the parameters audioSampling16 k, audioSampling22.05 k, and audio Sampling48 k for determining audio sampling frequency, the parameters being defined in the ISO/IEC 14496-1 which conforms to MPEG-4 Version 1.

12. The terminal of claim 10, wherein the audio capability registration unit defines a protocol element further comprising at least one of a parameter numberOfMonoObjects for determining the number of mono objects, a parameter numberOfStereoObjects for determining the number of stereo objects, and a parameter numberOfSpeechObjects for determining the number of speech objects which are defined in the ISO/IEC 14496-1 which conforms to MPEG-4 Version 1.

13. The terminal of claim 10, wherein the audio capability registration unit defines a protocol element further comprising at least one of a parameter memoryForData for determining the size of data memory, parameters lowProcessing and highProcessing, which are reserved in association with complexity, and a parameter numberOfTTSIObjects for determining the number of text-to-speech information (TTSI) objects which are defined in the ISO/IEC 14496-1 which conforms to MPEG-4 Version 1.

14. The terminal of claim 1, wherein, in order to determine an MPEG compliant system profile which conforms to MPEG-4 Version 1 and the level of the system profile, a plurality of parameters defined in the ISO/IEC 14496-1 are defined as "BOOLEAN", thereby registering one selected from the plurality of parameters.

15. The terminal of claim 1, wherein the video codec and the audio codec comprise an MPEG-4 video codec means for performing video coding/decoding, and an MPEG-4 audio codec means for performing audio coding/decoding.

16. The terminal of claim 15, wherein the MPEG-4 video codec means and MPEG-4 audio codec means perform the video and audio coding/decoding defined in the ISO/IEC 14496 standard.

* * * * *